United States Patent [19]

Wise

[11] Patent Number: 5,586,111
[45] Date of Patent: Dec. 17, 1996

[54] IN-LINE TEST SWITCH FOR COMMUNICATIONS NETWORK

[75] Inventor: James Henry Wise, Palmyra, Pa.

[73] Assignee: The Whitaker Corporation, Wilmington, Del.

[21] Appl. No.: 310,291

[22] Filed: Sep. 21, 1994

[51] Int. Cl.⁶ .................................................... H04J 1/16
[52] U.S. Cl. ................................................ 370/241; 375/213
[58] Field of Search ............................. 370/13, 17, 94.3, 370/56; 371/20.1, 29.1; 324/533, 532, 534, 66; 379/6, 26, 25; 340/825.49, 529, 572; 359/154; 375/213, 212, 224

[56] References Cited

U.S. PATENT DOCUMENTS

| | | | |
|---|---|---|---|
| 3,978,291 | 8/1976 | Bergeron, Jr. et al. | 179/16 R |
| 4,901,004 | 2/1990 | King | 324/66 |
| 4,970,466 | 11/1990 | Bolles et al. | 423/533 |
| 5,051,741 | 9/1991 | Wesby | 340/825.49 |
| 5,062,151 | 10/1991 | Shipley | 359/154 |
| 5,289,340 | 2/1994 | Yoshifuji | 361/695 |
| 5,296,850 | 3/1994 | King | 340/825.49 |
| 5,410,535 | 4/1995 | Yang et al. | 370/13 |

FOREIGN PATENT DOCUMENTS

| | | |
|---|---|---|
| 0264239 | 4/1988 | European Pat. Off. . |
| 2620890 | 3/1989 | France . |
| 2635426 | 2/1990 | France . |
| 2695279 | 3/1994 | France . |

*Primary Examiner*—Douglas W. Olms
*Assistant Examiner*—Dang Ton

[57] ABSTRACT

A communications network wherein the individual communication lines extend to peripheral user devices from a central hub. A test switch is interposed in the communication lines in the vicinity of the hub. The test switch functions to selectively disconnect one of the communication lines from the hub and instead connect that line to a tester. A remote active termination device connected in the line provides the proper line termination for the test being performed.

8 Claims, 3 Drawing Sheets

Microfiche Appendix Included
(30 Microfiche, 201 Pages)

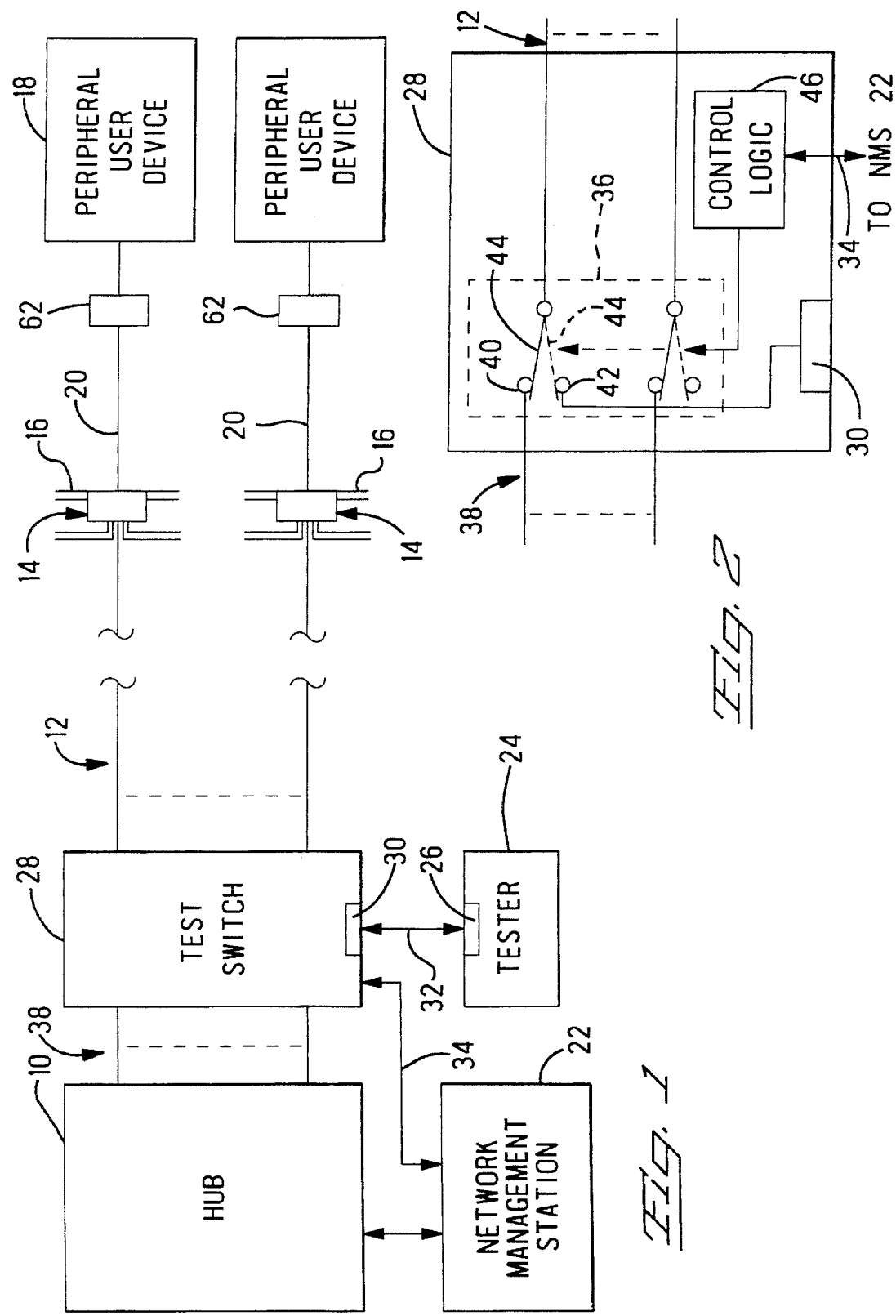

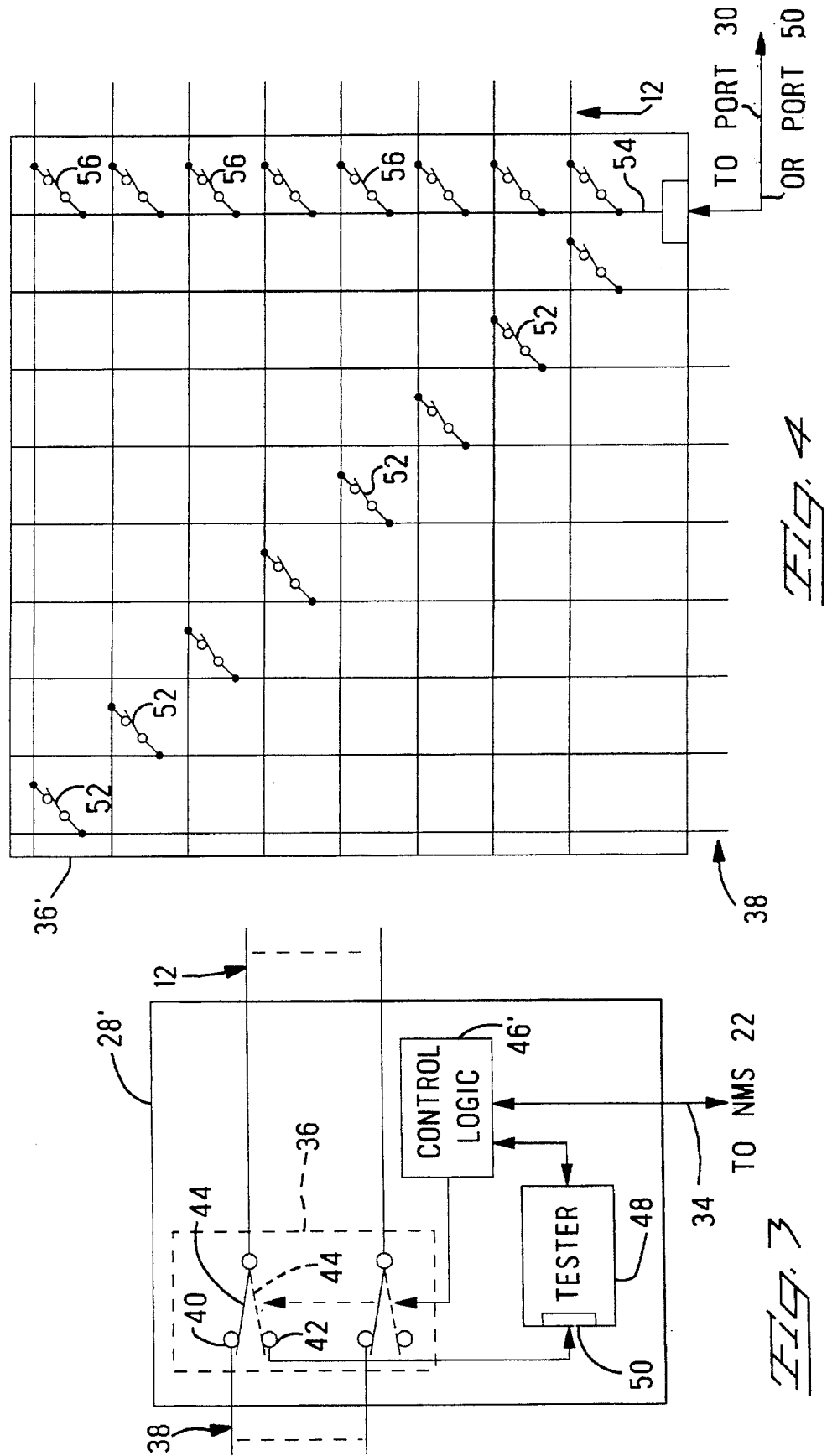

IN-LINE TEST SWITCH FOR COMMUNICATIONS NETWORK

This application contains two Appendices recorded on 30 microfiches, 201 pages.

BACKGROUND OF THE INVENTION

This invention relates to communications networks and, more particularly, to an in-line switching arrangement for providing the capability of testing individual communication lines without disconnecting a line under test from the network.

Local area networks, or LAN's, are becoming increasingly popular. In such a network, a plurality of computers are interconnected by dedicated wiring through a hub (or concentrator) for communication therebetween. These networks are typically overseen by a system operator having the responsibility for maintaining the integrity of the network. Accordingly, the system operator should have the capability of performing tests on the communication lines forming the network.

In the past, when performing such tests, it was common practice to have a service technician disconnect a communication line from the hub, connect the line to a testing device, disconnect the computer from the remote end of the line, terminate the remote end of the line with a desired termination for the test being performed, perform all such tests, reconnect the computer to the remote end of the line and reconnect the line to the hub. It is apparent that such practice is very labor intensive. It is therefore an object of the present invention to provide an arrangement for testing the communication lines in a communications network wherein no such disconnections and reconnections are required, so that manual intervention is kept to a minimum.

SUMMARY OF THE INVENTION

The foregoing and additional objects are attained in accordance with the principles of this invention in a communications network having a hub and a plurality of communication lines each extending from the hub to a distal end connectable to a respective one of a plurality of peripheral devices by providing an arrangement for testing a selected one of the plurality of communication lines. The testing arrangement comprises testing means having an output port for evaluating a predetermined characteristic of a communication line connected to the output port. Controllable test switch means is connectable to the testing means output port and is interposed in the plurality of communication lines in the vicinity of the hub between the hub and the plurality of communication line distal ends. The test switch means is controllable for each of the communication lines to effect either a through connection from the hub to the respective distal end or a connection from the testing means output port to the respective distal end via that communication line. Test switch control means is provided for controlling the test switch means to effect a connection between the testing means output port and a selected one of the communication lines, the test switch control means being effective so that at most only one communication line at a time is connected to the testing means output port.

BRIEF DESCRIPTION OF THE DRAWINGS

The foregoing will be readily apparent upon reading the following description in conjunction with the drawings in which like elements in different figures thereof are identified by the same reference numeral and wherein:

FIG. 1 is a block diagram of a local area network having incorporated therein test switch apparatus constructed in accordance with the principles of this invention;

FIG. 2 is a block diagram showing a first embodiment of test switch apparatus according to this invention;

FIG. 3 is a block diagram showing a second embodiment of test switch apparatus according to this invention;

FIG. 4 shows an alternative switch construction for the test switch apparatus of FIGS. 2 and 3.

DETAILED DESCRIPTION

Figure 5:
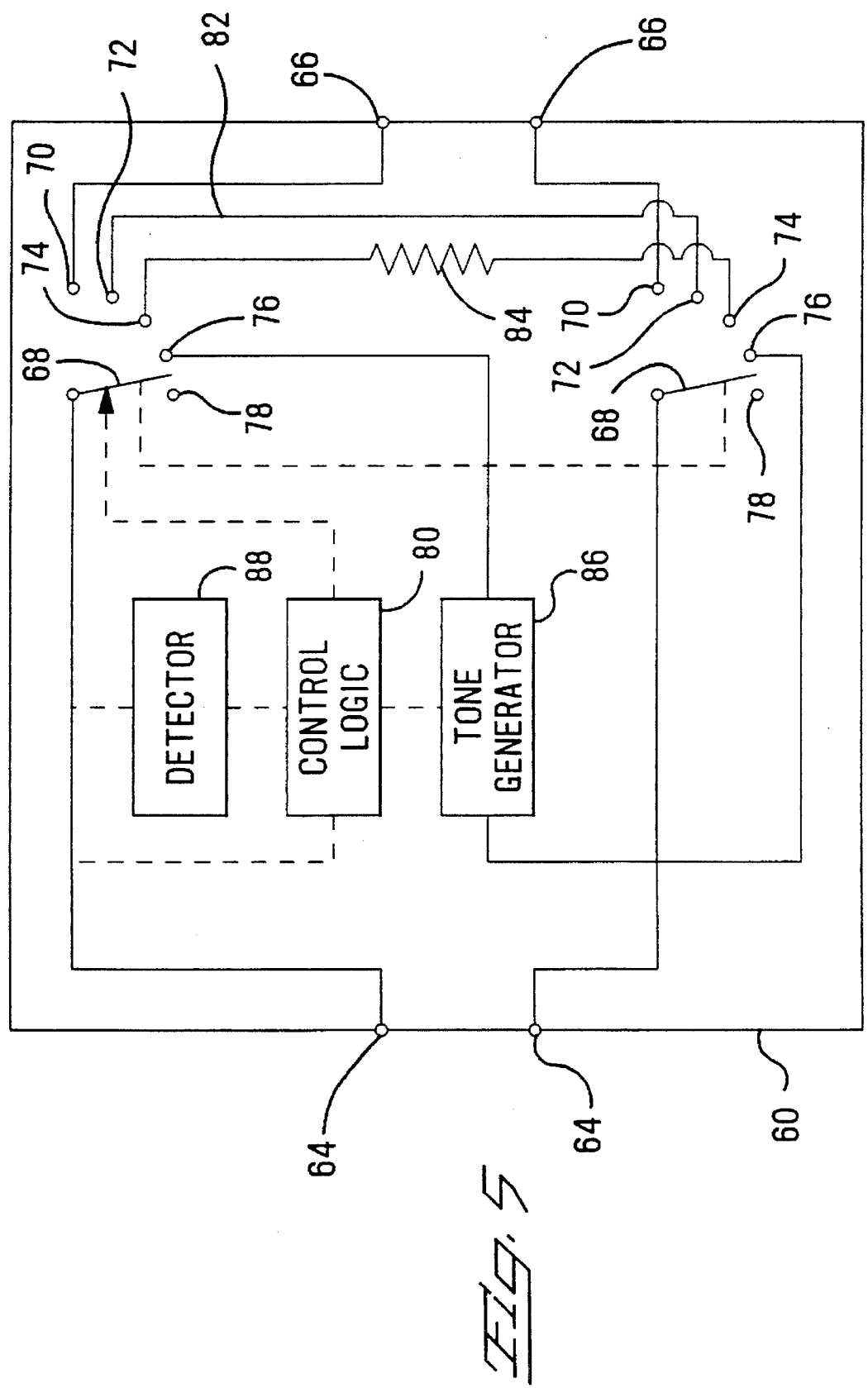
FIG. 5 is a block diagram illustrating an active termination device which may be utilized in the network of FIG. 1.

FIG. 1 illustrates a communications network having a hub, or concentrator, 10 connected to a plurality of communication lines 12. It is conventional to run the lines 12 from the hub 10 above ceilings, below floors and behind walls, where they are virtually inaccessible. Each of the lines 12 is usually terminated by an outlet, indicated generally by the reference numeral 14, which is usually wall mounted behind a wall 16, by means of which an appropriate peripheral user device, typically a computer, 18 can be coupled to a respective one of the communication lines 12 by plugging into the outlet 14 a relatively short cable 20. A network management station 22, which may be one of the computers connected in the communications network, is utilized by the system operator for controlling and monitoring the operation of the communications network. The foregoing is conventional and forms no part of the present invention. For testing the lines 12, there is provided a tester 24 having an output port 26. The tester 24 can either be incorporated within an enclosure so that it is a portable unit, or may be permanently installed in the communications network, as will be described hereinafter. In either case, the tester 24 is illustratively similar to the MT350 Scanner manufactured by MicroTest of Phoenix, Ariz. Such a device is described in U.S. Pat. No. 4,970,466, issued Nov. 13, 1990, the contents of which are hereby incorporated by reference herein. This patent discloses a handheld unit, which may be modified for mounting on a circuit card when permanently installed in the communications network. The tester disclosed in the referenced patent is capable of selectively evaluating various characteristics of a line connected to its output port. For example, the tester can determine the length of the line, its capacitance and its resistance. It can also evaluate the near end cross talk of a line, its attenuation characteristics at various frequencies and the noise on the line within various frequency bands. Further, the tester can also be controlled to automatically run a combination of these tests.

To allow the testing of the communication lines 12, in accordance with the principles of this invention there is provided a test switch 28 interposed in the communication lines 12 in the vicinity of the hub 10 between the hub 10 and the outlets 14 at the distal ends of the lines 12. The test switch 28 also includes a port 30 by means of which the tester 24 is connectable to the test switch 28 through a cable 32. As will be described in full detail hereinafter, the test switch 28 is controllable for each of the lines 12 to effect either a through connection from the hub 10 to the respective outlet 14 at its distal end or a connection from the tester output port 26 to the outlet 14 via the line 12. Such switching is controllable from the network management station 22 by appropriate instruction signals provided over the cable 34.

FIG. 2 illustrates a first embodiment for the test switch 28. As shown in FIG. 2, the test switch 28 includes a switch array 36 interposed between the communication lines 12 and the lines 38 extending back to the hub 10, each of the lines 38 corresponding to a respective one of the lines 12. It will be understood that although a single lead is shown for each of the lines 12, 38, each of the leads represents a multi-wire line. Similarly, in the discussion which follows, each of the switches in the array 36 represents a multi-pole switch to accommodate the multi-wire lines.

As shown in FIG. 2, for each of the sets of lines 12, 38, within the array 36 there is a switch having a normally closed contact 40 connected to the respective one of the lines 38, a normally open contact 42 connected to all of the other normally open contacts of the array 36 and to the test switch port 30, and an armature 44 connected to the respective line 12. The armature 44 is movable between its normally closed position as shown by the solid line wherein a through connection is provided between the lines 38 and 12 to the position indicated by the broken line wherein a connection is provided between the line 12 and the test switch port 30, to which the tester output port 26 is coupled. The armature 44 is illustratively part of a relay switch and its movement is controlled by the control logic 46. The control logic 46 illustratively includes a Neuron® chip manufactured by Echelon Corp. which functions as a transceiver for receiving instructions from the network management station 22 over the cable 34. When a specific one of the communication lines 12 is to be tested, an appropriate instruction to the control logic 46 causes the armature 44 corresponding to that specific one of the communication lines 12 to be moved to disconnect that communication line 12 from the hub 10 and connect it to the test switch port 30 for subsequent testing of the communication line 12 by the tester 24. Upon completion of the testing, the control logic 46 reconnects that communication line 12 to the hub 10 via its respective one of the lines 38. It is to be noted that at any given time, at most only one of the communication lines 12 is connected to the test switch port 30.

FIG. 3 illustrates a second embodiment of the test switch apparatus wherein the test switch 28' is constructed with a built-in tester 48 having its output port 50 connected to the normally open contacts 42 of the switch array 36. For the embodiment shown in FIG. 3, the control logic 46', in addition to exercising control over the switch array 36, also transmits instructions from the network management station 22 to control the tester 48, the tester 48 transmitting its test results back to the network management station 22.

FIG. 4 illustrates an alternative construction for the switch array, designated 36'. As shown in FIG. 4, the switch array 36' is a sparse M by M+1 switching matrix, where M is the number of communication lines 12. Eight such communication lines 12 and hub lines 38 are shown in FIG. 4, so that the switch array 36' is an eight by nine matrix. The additional line on the side of the matrix 36' corresponding to the lines 38 is connected either to the test switch port 30, when the tester 24 is external to the test switch 28, or to the tester 48 output port 50 when the tester 48 is part of the test switch 28'. Within the switch array 36', each of the lines 38 is connected through a respective normally closed crosspoint switch 52 to a respective one of the communication lines 12. Thus, for the eight by eight array connecting the lines 38 to the lines 12, only the crosspoints along the diagonal of that array are filled. All of the communication lines 12 are connected to the line 54, which is connected to either the port 30 or the port 50, by a normally open crosspoint switch 56. Along each row of the array 36', the operation of the switches 52, 56 is complementary so that if a switch 52 is closed, its corresponding switch 56 in that row is open, and vice versa. The control logic 46, 46' is effective so that at any given time at most only one of the switches 56 is closed.

As discussed above, the tester 24, 48 is capable of performing a variety of tests on the communications line 12 to which it is connected. Each of the tests typically requires that the line being tested have a particular termination at its end remote from the tester. FIG. 5 shows an illustrative remote active termination device, designated generally by the reference numeral 60, which is adapted to selectively provide an appropriate termination to a line in response to control signals received over the line. The device 60 may be incorporated in the wall outlet 14 (FIG. 1) for testing the lines 12. To test the cable 20, together with the line 12, the device 60 can be incorporated in an in-line electrical module (often referred to as a "brick") 62 (FIG. 1) in the cable 20 remote from the outlet 14, leaving an almost negligible length of cable, or no cable, between the device 60 in the brick 62 and the peripheral user device 18. Alternatively, the device 60 can be incorporated within the peripheral user device 18 itself.

Referring to FIG. 5, the active termination device 60 at one end has a set of input terminals 64 for connection to a communication line 12 and at the other end has a set of output terminals 66, each set of terminals being illustratively two in number. The active termination device 60 includes a multi-pole relay switch illustrated as having a pair of ganged armatures 68 selectively connectable to pairs of contacts 70, 72, 74, 76 and 78. The armatures 68 are controlled by a relay coil (not shown) which is selectively energized by the control logic 80. Preferably, the relay switch is of the type that maintains its state until instructed to change by the control logic 80.

As shown, when the relay switch is in a state where the armatures 68 engage the contacts 70, the input terminals 64 are coupled directly to the output terminals 66. This is the "normal", or "straight through", state of the active termination device 60. When the armatures 68 engage the contacts 72, this is a loopback state where the input terminals 64 are shorted by the wire 82. When the armatures 68 engage the contacts 74, the input terminals 64 are terminated by the resistor 84, which preferably has a value equal to the characteristic impedance of the line. When the armatures 68 engage the contacts 76, the tone generator 86 is connected to the input terminals 64. Illustratively, the tone generator 86 applies a 2.5 volt, 20 mA sinewave of frequency 10 KHz of constant amplitude to the input terminals 64, upon receiving an appropriate command from the control logic 80. When the armatures 68 engage the contacts 78, the input terminals 64 are terminated by an open circuit.

The active termination device 60 also includes a detector 88. The detector 88 is responsive to an "activate" signal applied to the input terminals 64. This activate signal is a signal that is not present in any of the possible signatures provided on the communications line 12 during normal operation of the local area network. Alternatively, dedicated wire(s) may be utilized to carry the activate signal. Thus, for example, the activate signal may comprise a unique combination of tones. When the detector 88 recognizes the activate signal, it provides a "wake up" signal to the control logic 80. The control logic 80 illustratively includes a Neuron® chip manufactured by Echelon Corp., or alternatively may include a microprocessor of the 8051 family, or some other microprocessor based chip. The control logic 80 is normally in a quiescent state, but upon being activated in response to the wake up signal from the detector 88, it responds to a subsequent instruction received at the input terminals 64 from either the tester 24, 48 or the network management station 22 to control the relay switch to move the armatures 68 so as to cause the appropriate termination to be made to the line being tested. After controlling the relay switch, the control logic 80 returns to its quiescent state. Thus, whenever a termination of a line being tested is to be changed, first an activate signal is provided on the line to the input terminals 64 and then an instruction signal designating the desired termination is applied to the line. Therefore, there is no need for a technician to travel to the end of the line in order to change the termination of the line for testing purposes.

Accordingly, there has been disclosed an improved in-line switching arrangement providing the capability of testing individual communication lines in a communications network without disconnecting the line under test from the network. While illustrative embodiments of the present invention have been disclosed herein, it is understood that various modifications and adaptations to the disclosed embodiments will be apparent to those of ordinary skill in the art and it is intended that this invention be limited only by the scope of the appended claims.

The details of the LTU cards schematics for a fixed Ethernet version and the STU cards schematics for a fixed Ethernet version and the Controller A card schematics and a 15 Volt power supply schematics are attached in microfiche Appendix I. The details for a universal version, i.e. non-Ethernet version, are in additional drawings and a bill of materials, which are attached in microfiche Appendix II.

What is claimed is:

1. In a communications network having a hub and a plurality of communication lines each extending from said hub to a distal end connectable to a respective one of a plurality of peripheral devices, an arrangement for testing a selected one of said plurality of communication lines comprising:

testing means having an output port for evaluating a predetermined characteristic of a communication line connected to said output port;

controllable test switch means connectable to said testing means output port and interposed in said plurality of communication lines in the vicinity of said hub between said hub and said plurality of communication line distal ends, said test switch means being controllable for each of said communication lines to effect either a through connection from said hub to the respective distal end or a connection from said testing means output port to the respective distal end via said each communication line; and test switch control means for controlling said test switch means to effect a connection between said testing means output port and the selected one of said communication lines, said test switch control means being effective so that at most only one communication line at a time is connected to said testing means output port.

2. The arrangement according to claim 1 wherein each of said communication lines is coupled at its distal end to a respective one of a plurality of active termination devices, each of said plurality of active termination devices including:

a set of input terminals for providing a connection to the respective communication line;

a set of output terminals;

at least one auxiliary line termination;

controllable switching means for selectively connecting said set of input terminals to said set of output terminals or to said at least one auxiliary line termination; and termination control means connected to said set of input terminals and adapted to receive instructions over said respective communication line for controlling said switching means.

3. The arrangement according to claim 1 wherein said communications network includes operator controlled management station means for controlling said communications network, and wherein said management station means issues commands to said test switch control means for controlling said test switch means.

4. The arrangement according to claim 3 wherein said test switch control means is coupled to said testing means and said management station means issues commands to said test switch control means for controlling said testing means.

5. The arrangement according to claim 4 wherein said testing means and said test switch control means are arranged to transmit test evaluation results to said management station means.

6. The arrangement according to claim 1 wherein said test switch means includes test port connector means for receiving a connection from said testing means output port and said testing means is a portable unit including means for coupling said testing means output port to said test port connector means.

7. The arrangement according to claim 1 wherein for each of said communication lines said test switch means includes a controllable switch armature coupled to said each communication line, said armature being movable for selective engagement with either a first contact coupled to said hub or a second contact coupled to said testing means output port.

8. The arrangement according to claim 1 wherein said test switch means is arranged as an M by M+1 switching matrix, where M is the number of communication lines connected to the test switch means, a first side of the matrix having M lines each coupled to a respective one of the communication lines, a second side of the matrix having M lines coupled to said hub and one line coupled to said testing means output port, all of said M lines of said first matrix side being connected through respective crosspoint switches to said one line of said second matrix side, and each of said M lines of said first matrix side being connected through a respective crosspoint switch to only a respective one of said M lines of said second matrix side.

* * * * *